United States Patent [19]

Weinberger et al.

[11] Patent Number: 5,425,085
[45] Date of Patent: Jun. 13, 1995

[54] LEAST COST ROUTING DEVICE FOR SEPARATE CONNECTION INTO PHONE LINE

[75] Inventors: Gerald J. Weinberger, Smithtown; Roger C. Lee, Wading River, both of N.Y.

[73] Assignee: Rates Technology Inc., Smithtown, N.Y.

[21] Appl. No.: 210,670

[22] Filed: Mar. 18, 1994

[51] Int. Cl.6 ............... H04M 15/00; H04M 7/00
[52] U.S. Cl. .................. 379/112; 379/111; 379/113; 379/114; 379/116; 379/130; 379/131; 379/219; 379/220; 379/221
[58] Field of Search ............... 379/111–116, 379/130–132, 219–221

[56] References Cited

U.S. PATENT DOCUMENTS

| | | | |
|---|---|---|---|
| 4,122,308 | 10/1978 | Weinberger et al. | 379/112 |
| 4,136,262 | 1/1979 | Clark, Jr. | 379/143 |
| 4,198,545 | 4/1980 | Haist et al. | 379/113 |
| 4,209,668 | 6/1980 | Weinberger et al. | 379/114 |
| 4,410,765 | 10/1983 | Hestad | 379/112 |
| 4,585,904 | 4/1986 | Mincone | 379/131 |
| 4,656,657 | 4/1987 | Hunsicker | 379/131 |
| 4,751,729 | 6/1988 | Treat | 379/113 |
| 4,813,065 | 3/1989 | Segala | 379/112 |
| 4,888,822 | 12/1989 | Weinberger et al. | 379/130 |
| 4,935,956 | 6/1990 | Hellwarth | 379/114 |
| 5,163,042 | 11/1992 | Ochiai | 379/220 |

Primary Examiner—Stephen Chin
Assistant Examiner—Vijay Shankar
Attorney, Agent, or Firm—James & Franklin; Harold James; Robert L. Epstein

[57] ABSTRACT

A device interconnects within the phone line coming from a first phone and routes telephone calls along a least cost route originating from the first telephone to a second telephone via the network. A housing forms an enclosure and has a first jack for interconnection to the phone side of the phone line and a second jack for interconnection to the network side of the phone line. The housing forms an enclosure which includes a switch for disconnecting the first phone from the network. The device generates a source of current through the switch to the first phone corresponding to the amount of current provided by the phone network. A database stores billing rate parameters for determining various communication paths of different carriers based on parameters such as the time and date of the call. Phone calls from the first phone are detected and stored. The database is addressed and a plurality of communication switch paths are identified as well as the cost rate of each path. The cost rates for each identified path are compared to determine a least cost route for the call. The device generates a number sequence corresponding to a desired carrier so that the dialed call is routed through the second jack and phone line to the selected communication path and carrier so as to establish a switched connection between the first and second phones.

26 Claims, 6 Drawing Sheets

LEAST COST ROUTING DEVICE FOR SEPARATE CONNECTION INTO PHONE LINE

FIELD OF THE INVENTION

This invention relates to a device which can be connected directly into the phone line for routing phone calls made from a first phone along the least cost path of the telephone network to a second phone.

BACKGROUND OF THE INVENTION

The advent of numerous local and long distance telephone carriers has resulted in a wide selection of different carriers which have different telephone cost rates depending on the time of day, the number of phone calls, the location of a calling party and other factors. Typically, a consumer chooses one carrier, and maintains that carrier account for all long distance calling needs, and in some instances for local calls also. With increased competition among interstate, intrastate, interlata and intralata phone carriers, a caller could save money if different carriers are chosen for each particular phone call to a particular destination.

It has been known to design complex phones that route calls along selected switching points via selected tie lines to establish a least cost route. For example, U.S. Pat. No. 4,122,308 to Weinberger et al. discloses such a device. It has been found, however, that many consumers are unwilling to purchase a complex telephone device in substitution for the phone already used in the home. Typically, consumers buy a phone for aesthetic or economic reasons. Consumers have been found unwilling to purchase complex phone equipment in lieu of phones already purchased which are more simple, smaller and aesthetically pleasing to the eye.

SUMMARY OF THE INVENTION

One of the features of the present invention is a device that may be connected within the phone line separate and apart from the telephone and which routes telephone calls along a least cost route originating from a first telephone through the telephone network to a second telephone.

Another feature of the present invention is a device that can be connected directly within the telephone line originating from a first telephone and can be hidden from view such as behind a furniture piece.

Another feature of the invention is a device for routing telephone calls along a least cost route that can be quickly attached and detached from the telephone line such as by telephone jacks.

In accordance with the present invention, the device routes telephone calls along a least cost route originating from the first telephone through the telephone network to a second telephone. As is conventional, the network has a plurality of alternate communication switch paths corresponding to different carriers which can be chosen to route the call.

A housing forms an enclosure and has jacks mounted on the housing for interconnection to the phone line. A first jack interconnects to the phone side of the phone line and a second jack interconnects to the network side of the phone line. The device components are contained in the enclosure and includes a switch which operatively connects to the first jack for disconnecting the first phone from the network. A current source is generated through the switch to the first phone and corresponds to the current provided by the phone network at the central office. A database stores billing rate parameters for determining a least cost communication path based on the least cost routing parameters, which could include such parameters as the time and date of the call.

Means is operatively connected to the switch for detecting and storing a dialed phone number originating from the first phone. The database is addressed for identifying a plurality of communication switch paths to the dialed number as well as the cost rate of each path. The cost rate of each path is compared to determine a least cost route for the call. A tone generator is connected to the switch means and the second jack and generates a number sequence corresponding to the desired carrier so that the dialed call is routed through the second jack and phone line to the selected communication carrier so as to establish a switched connection between the first and second phones.

When a call is incoming, the switch connects the first phone to the network. An internal power supply provides power to the current generating means. In one aspect of the invention, the means generating the number sequence is a dual tone multifrequency generator that generates the necessary tones to the central office for establishing the least cost route. The detecting means includes, but is not limited to a dual tone multifrequency detector for detecting tones sent by the first phone.

The housing may be a number of different configurations. In one embodiment it is substantially cylindrical with opposing ends. The first jack is positioned on one end and the second jack is positioned on the other end.

In another aspect of the invention, the database is updated with a current billing rate schedule. In one aspect of the invention the update means includes a circuit board mounted within the enclosure, and the database is contained on a removable chip positioned on the circuit board. The housing may include a removable cover for accessing the chip on the circuit board to replace it with an updated chip. In still another aspect of the invention, the device includes a modem for receiving signals through the telephone line and downloading updated information to the database.

In still another aspect of the invention, a display is mounted on the housing and visibly displays the time and date. The time and date display receives a predetermined dial sequence from the first phone corresponding to a predetermined date and time to be displayed. After receiving the predetermined dial sequence, the display time and date is changed based on the received signals. In some designs, the date and time display can also be changed manually.

DESCRIPTION OF THE DRAWINGS

The foregoing advantages and features of the present invention will be appreciated more fully from the following description, with reference to the accompanying drawings in which.

DETAILED DESCRIPTION OF THE INVENTION

Figure 1:
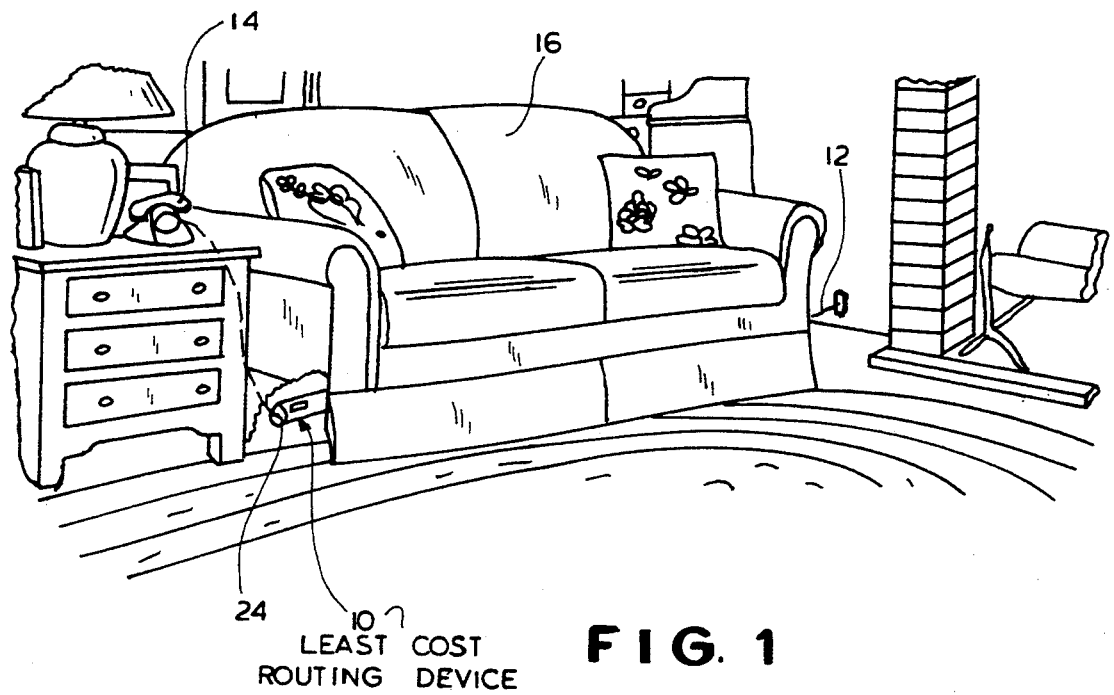
FIG. 1 is an environmental view showing the device in accordance with the present invention positioned behind a sofa in a household.

Referring now to FIG. 1, the device 10 of the present invention is shown connected or "plugged" into the phone line 12 of a first telephone 14 in the environment of a household 15 and positioned out of sight behind a sofa 16. As evident, the device of the present invention is advantageous because it can be readily connected within the phone line 12 and hidden from view without purchasing a new phone. Many consumers select phones based on aesthetic and economic reasons, and some consumers are unwilling to spend large sums for complex and unwieldy phones.

Figure 7:
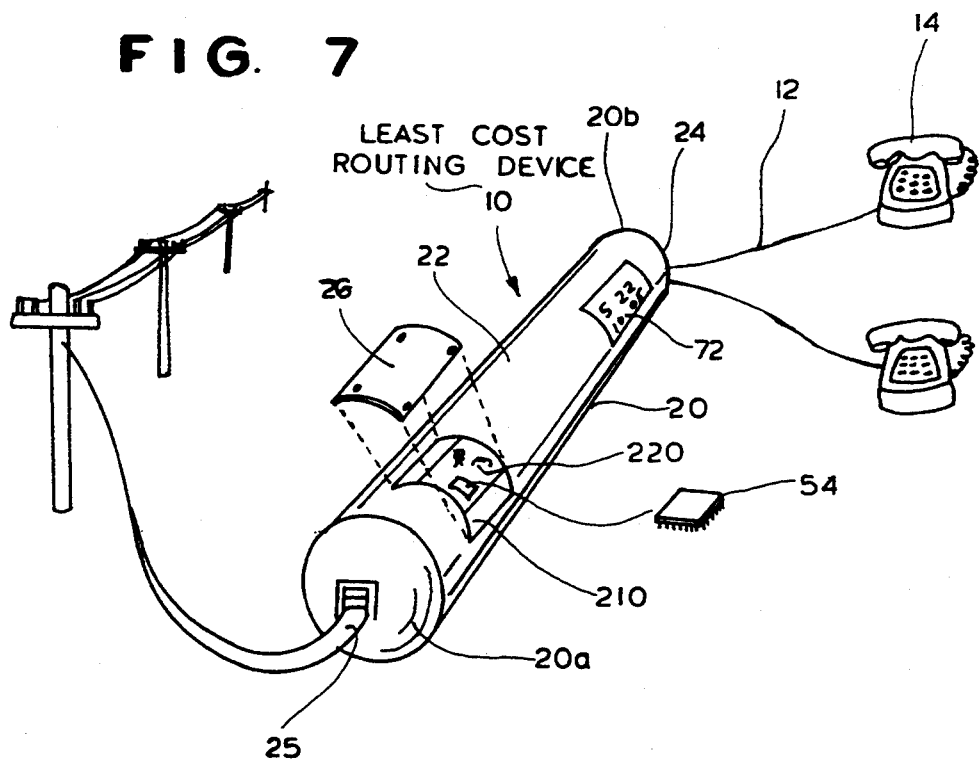
FIG. 7 is a isometric view of one design of the device showing a cover that has been removed for accessing the chip to update the database.

As shown in FIGS. 1 and 7, the device 10 includes a housing 20 which forms an enclosure 22. In the illustrated embodiment, the housing 20 is cylindrically configured with two opposing ends 20a, 20b. Although the cylindrical configuration is illustrated, any configuration can be used depending on the designer's choice and purchaser's desire. It is even possible to design the device 10 to be an ornament that can rest on a table or other readily visible place. A cylindrical configuration for the housing 20 has been found easy to mold and relatively inexpensive. AS shown in the drawings, the housing includes a first jack 24 for connecting "plugging" to the phone side of the phone line 12 and a second jack 25 for connection or "plugging" to the network side of the phone line.

The electronic components forming the device 10 are mounted within the enclosure, typically on a circuit board as shown in FIG. 7. The housing can be designed with a removable cover 26 (FIG. 7) to access the components, or a removable end where the circuit board can be slid outward to access any components.

Figure 2:
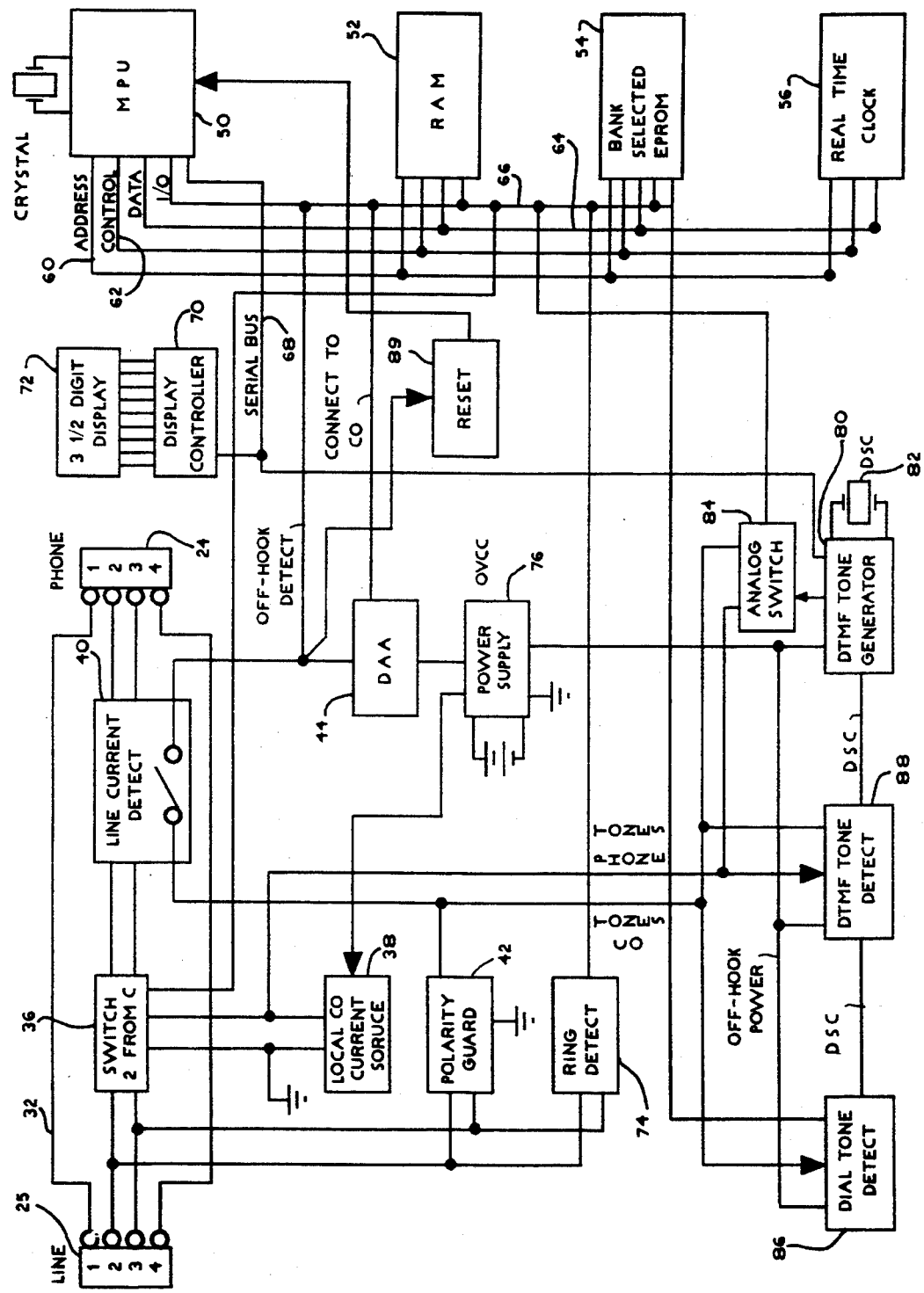
FIG. 2 is a block diagram of the overall circuit used in the device of the present invention.

Referring now to FIG. 2, the basic components used in the device of the present invention are shown in the block diagram. As noted before, the second phone jack 25 has one line 32 connecting to the first phone jack 24 positioned on the other end of the cylindrically configured housing. The phone jack 25 connects to a switch 36, referred to as a 2 Form C switch, which switches the phone off the network to the other components contained in the device. The switch 36 connects to a "local CO (central office)" current source 38 which generates a current corresponding to the current supplied by the central office of the network. The switch 36 connects and disconnects the phone from the network into the current source 38, which in turn supplies a current to the phone equivalent to the current supplied by the central office of the network. The switch 36 also connects to a line current detector 40 (off-hook detector) which detects an off-hook or on-hook state of the phone. A combination polarity guard 42 and Direct Access Arrangement 44 (DAA) interfaces and allows communication to the network. The line current detector can be formed from numerous types and brands of device. One available device is a teltone M949 device.

The controller for the device 10 includes the standard components of a microprocessor including a microprocessing unit 50 (MPU) such as a Toshiba TMPZ 84C011 and a RAM chip 52 such as a generic chip sold by Hyundai under the designation HY6116. A bank selected Eprom 54 for storing the database is also included and can be a generic Eprom chip such as a Toshiba TC574000 chip with more Eprom than the microprocessor can directly address. A real time clock 56 maintains the proper time and provides signals for controlling the device. An example of a clock chip which can be used for the device is an Epsom RTC62421B chip. The microprocessing unit 50 includes the conventional address, control, and data buses 60, 62, 64 and an input output bus 66.

A serial bus 68 connects from the MPU 50 to a display controller 70 which controls a 3½ digit display 72. The 3½ digit display 72 displays the time and date and is positioned on the outside of the housing where it can be readily read. A ring detect circuit 74 is interconnected to the input-output bus and the incoming line jack 30 and detects the ringing of the phone. A power supply 76 is also included and provides the current for the local CO current generator 38. In the present invention, power can be generated from the phone company when the first phone is "off-hook", or generated from the battery when the first phone is "on-hook".

Once a minute the device will update the date and time on the display 72 and then revert to a passive state also known as the "sleep" state. It is not possible to draw power for the device 10 from the phone company in an "on-hook" condition. Therefore, the power supply 76 provides power once a minute to change the display 72 to a new setting. A DTMF (dual tone multi-frequency) tone generator 80 includes a crystal oscillator 82 which together generate the tone frequencies necessary to generate the tones for the dialing sequences. An analog switch 84 allows switching to either the-phone or the network. The dial tone detect circuit 86 connects to the line coming from the polarity guard 42 and connects to the line detector 40. The DTMF tone detector 88 detects the tones generated from the first phone. The reset circuit 89 allows for resetting the entire circuit from a begin point.

Figure 3:
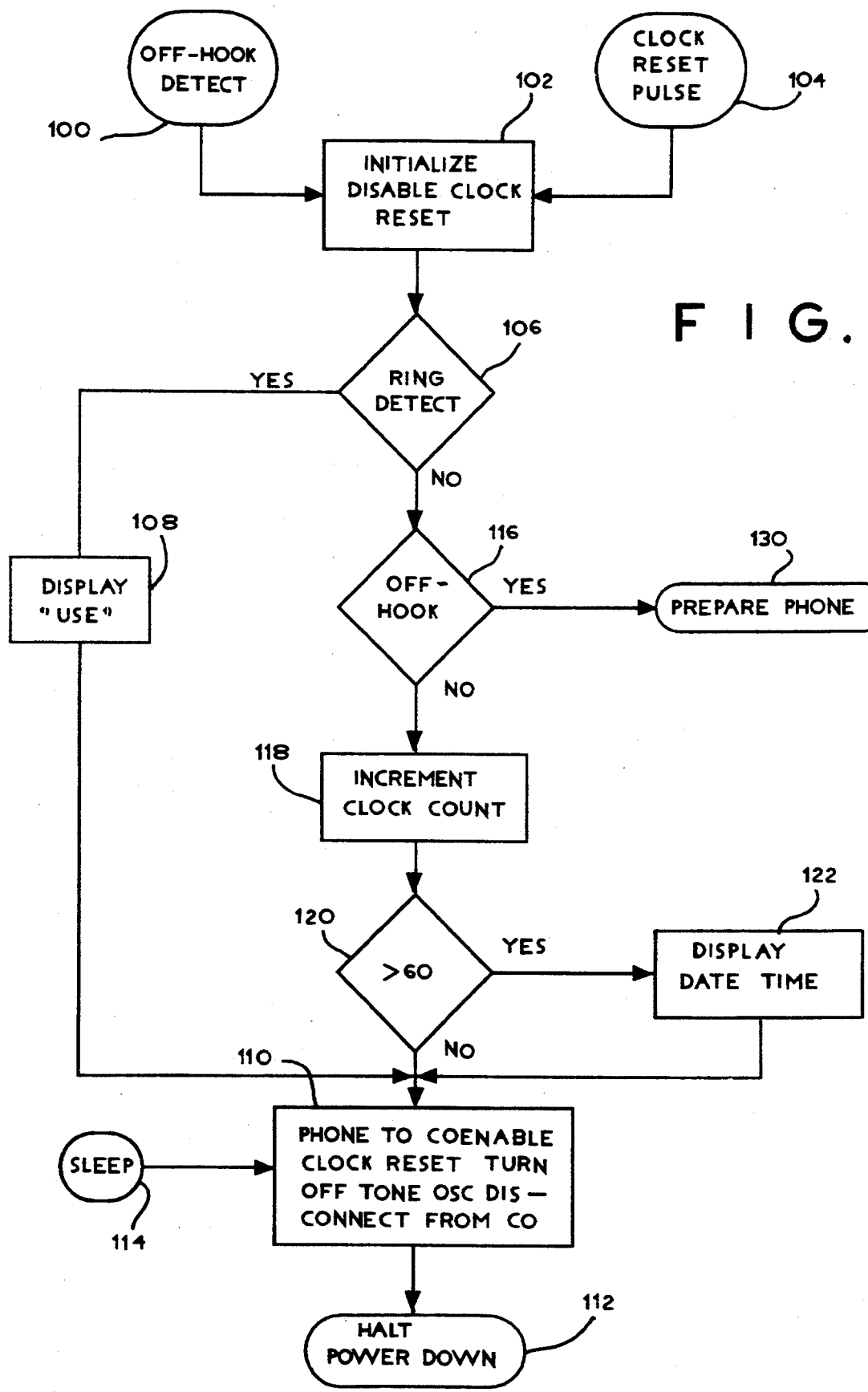
FIG. 3 is a flow chart depicting the initializing of the device and flow of an incoming call to the phone.
Figure 4:
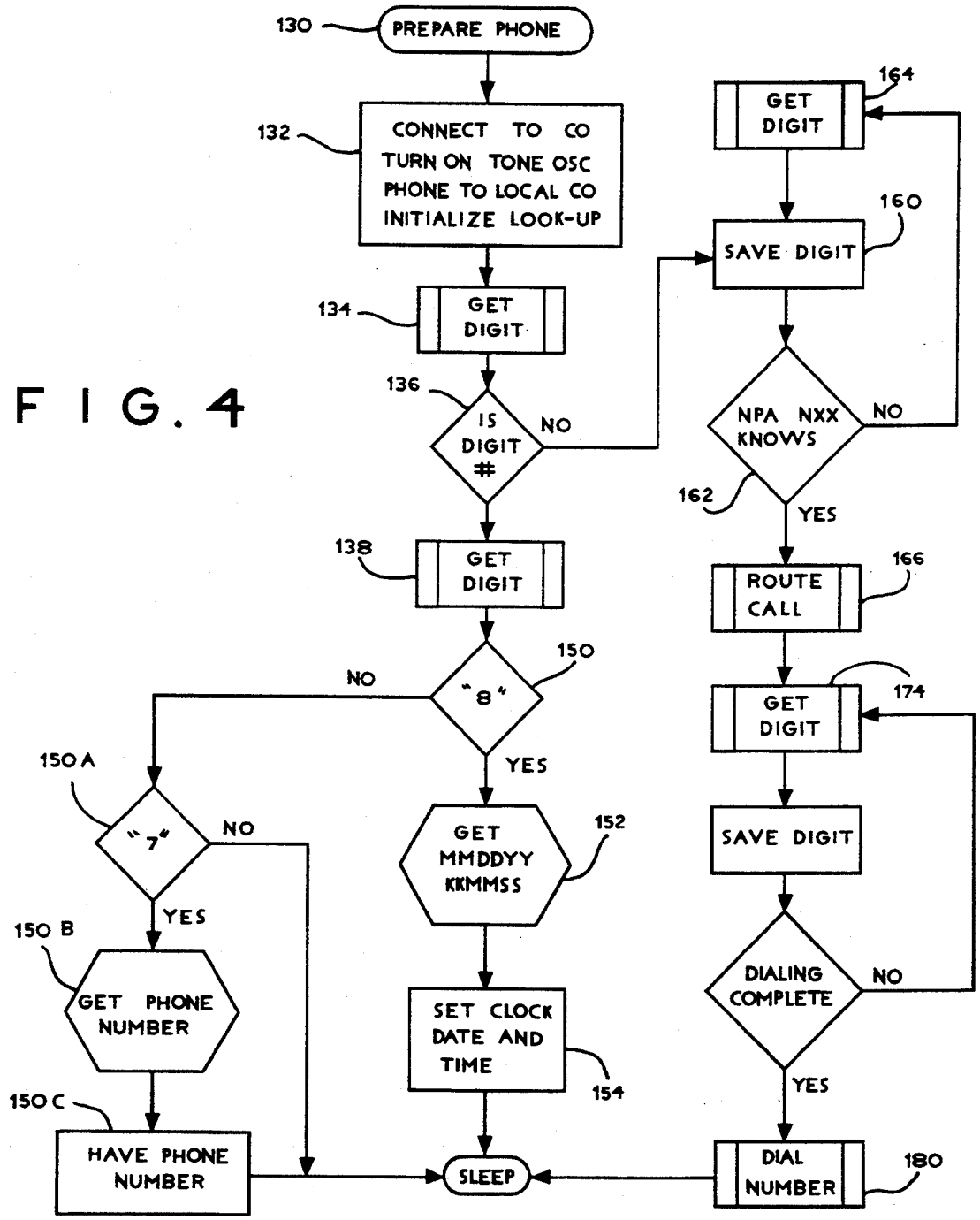
FIG. 4 is a flow chart depicting the routine for changing the display and dialing the codes for least cost routing in accordance with the present invention.
Figure 5:
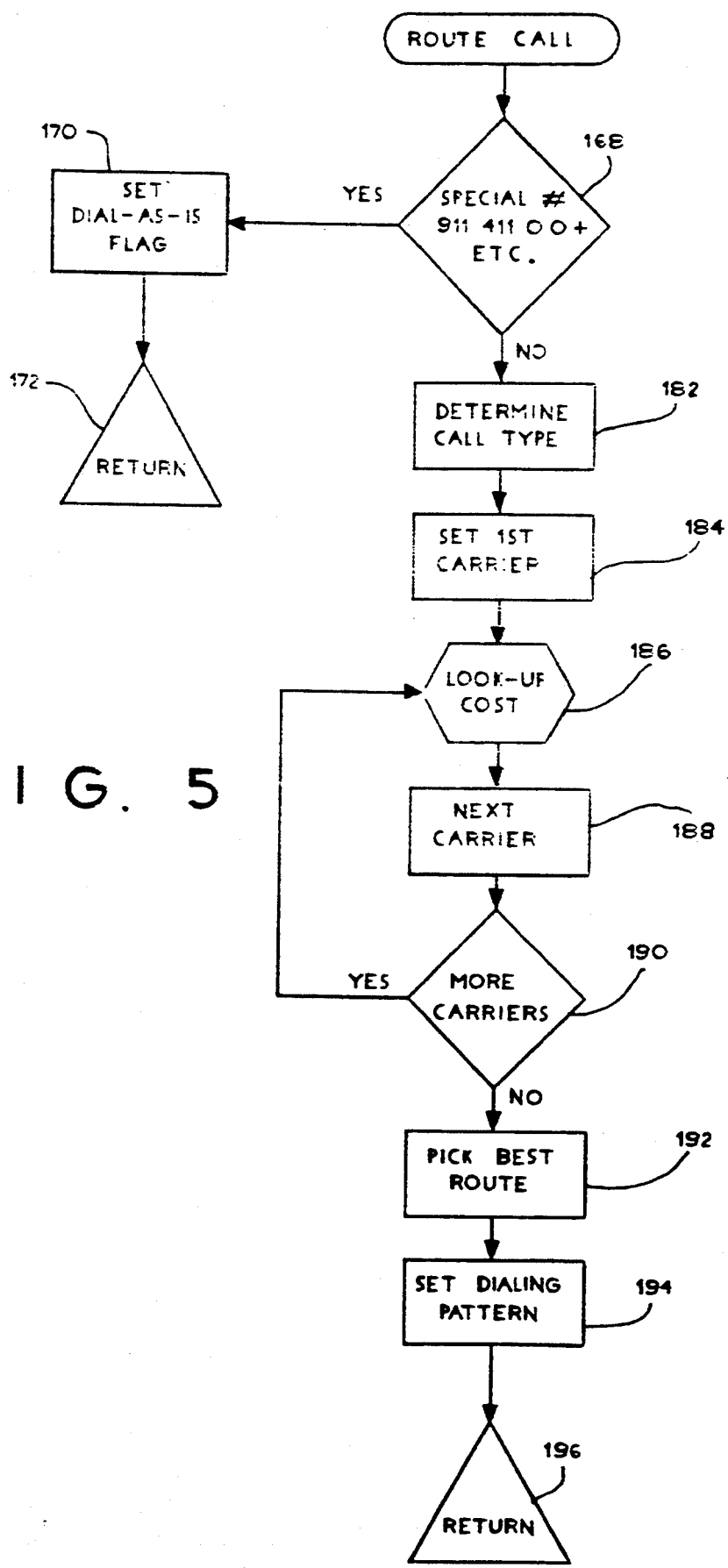
FIG. 5 is a flow chart of a subroutine in the flow chart of FIG. 4 showing a database look-up routine.

Referring now to FIGS. 3-5, there are illustrated flow charts depicting the operation of the device in accordance with the present invention. The steps are enumerated beginning with the numeral 100 and follow through with sequential even numbers in most cases.

Initially, as shown in FIG. 3, in step 100 the device detects an "off-hook" condition for the first phone, such as when the handle is raised from the cradle of a phone. The device is initialized in step 102 and the clock reset is disabled. The initializing step 102 can also occur when the reset occurs such as a startup in step 104. Thus, it is evident that a reset occurs in two conditions: 1) when the phone goes "off hook" or 2) when the real time clock emits a pulse (such as once a second) for setting the clock.

In step 106 the ring detect circuit 74 detects if there is a ring. If a ring is detected, the word "USE" in step 108 is displayed on the 3½ digit display 72 corresponding to the device 10 being in use. The phone remains connected by the switch 36 to the central office network and the DTMF tone oscillator and generator 80, 82 operation are terminated. The power is shut down in step 12 of the device to allow communication between the first phone and the second phone, who was the calling party in this instance. The device 10 has gone into a passive mode also referred to as a "sleep mode" in step 14.

If during initialization in step 106 the ring detector did not detect a ring, the device 10 then checks for an off-hook condition in step 16. If there is no off-hook condition, then the device is restarting such as from a clock pulse. The clock count is incremented in step 118. If the clock count is greater than 60 seconds in step 120, then the display controller 70 displays a new date and time on the 3½ digit display 72 in step 122. If the count is not greater than 60 seconds then the phone remains connected to the central office (phone network) in step 110 and the phone has gone into a passive mode in step 112.

If the off-hook condition is sensed in step 106, the phone is prepared in step 130, i.e., the device is prepared to receive DTMF tone signals from the first phone (FIG. 4). In this step the device 60 connects to the central office (phone network) in step 132 and the DTMF tone generator 80, 82 is set to the "on" position. The first phone is connected via the switch 36 to the local central office, i.e., the local current source 38, to generate a current through the switch to the jack 34 and to the first phone. Additionally, in step 132, the device is initialized to begin the lookup routines in the database.

Figure 4A:
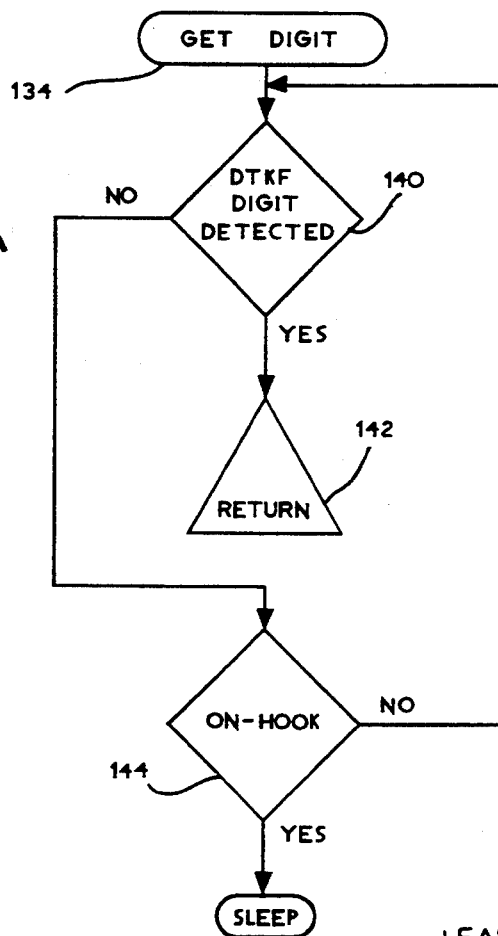
FIG. 4A is a flow chart illustrating the routine for obtaining digits for a least cost route.

The caller at the first phone then dials a number and the device 10 enters a subroutine known as "get digit" in step 134 (FIG. 4A). The DTMF tone detector 88 detects each digit as it is called. If the digit is a "pound sign" ("#") in step 136, then the device is initialized to prepare the date and time on the display 72. Although the "pound sign" is illustrated as the initial sequence code for settling the time and date, it is readily apparent that any sequence of codes can be used as long as the code is not the beginning of a telephone number.

If the digit is a "pound sign", the "get digit" subroutine is followed once again in step 138. The "get digit" subroutine is shown in greater detail on the left side of FIG. 4. A DTMF digit is detected in step 140 and the routine then returns in step 142 to the mainflow chart. If the digit is not detected, a test is made to see whether the first phone current is on hook in step 144. If the first phone is not on hook the subroutine continues to detect digits. If the first phone is on hook, then the device goes into "sleep" or passive mode.

If the numeral 3 is detected in step 150, corresponding to the letter D, then the DTMF tones following are input as the date, such as the month, day and year, as well as the time, such as the hour, minute and seconds in that order in step 152, and displayed on the 3½ digit display in step 154. The device then routes into the passive "sleep" mode. If the numeral "3" was not detected in step 150 the device then routes into the sleep mode, or could implement other special functions indicated by the digit, e.g. (test modes). For example, if the number "7" is detected (step 150A) for the phone, corresponding to the letter "P", the telephone number for the device is obtained (step 150B), and saved (step 150C). Typically, this routine can be started by the caller pressing the pound (#) key, and the number being stored as NPA NXX XXXX.

If the pound sign was not detected in step 136, the detected digit is saved in step 160 and the detected digits are then analyzed in step 12 to determine if the area code and exchange (the NPA NXX) are known in step 12. If they are not known, the get "digit routine" is repeated in step 14 until the NPA NXX code is known. The call is then routed in step 16 in a route call routine, which is set forth in FIG. 5. The device distinguishes from the dialed digit if an area code (NPA) has been dialed. If the NPA has not been dialed, this device uses the NPA from the data specified for the device location.

As shown in FIG. 5, the device 10 initially determines whether the area code and exchange digits known are in a special category in step 168 such as 911, 411, 800, or 900 numbers. If the dial routine is a special number, the telephone signal is flagged in step 170 and returned to the main routine where further digits such as the last four digits of the phone number are obtained and received in step 174. The digits are saved in step 176 and the dialing is completed in step 178. The number is then dialed in step 180 and the device routes into the passive or sleep mode and the call completed. If the dialing is not complete, then the get digit routine is repeated until all digits from the telephone number are obtained.

If the number in step 168 is not a special number (FIG. 5), the call type is determined in step 182, e.g. if the call is local, interlata, intralata, interstate, intrastate or a combination thereof. In step 284 the first carrier is set and the cost is looked up in the database in step 186. The next carrier is then set in step 188. If there are more couriers in step 190, the look up cost is repeated until all carriers are exhausted. In step 192 the best carrier is picked and the dialing pattern set in step 194. The sequence is then returned in step 196 to the route call routine of step 166.

Figure 6:
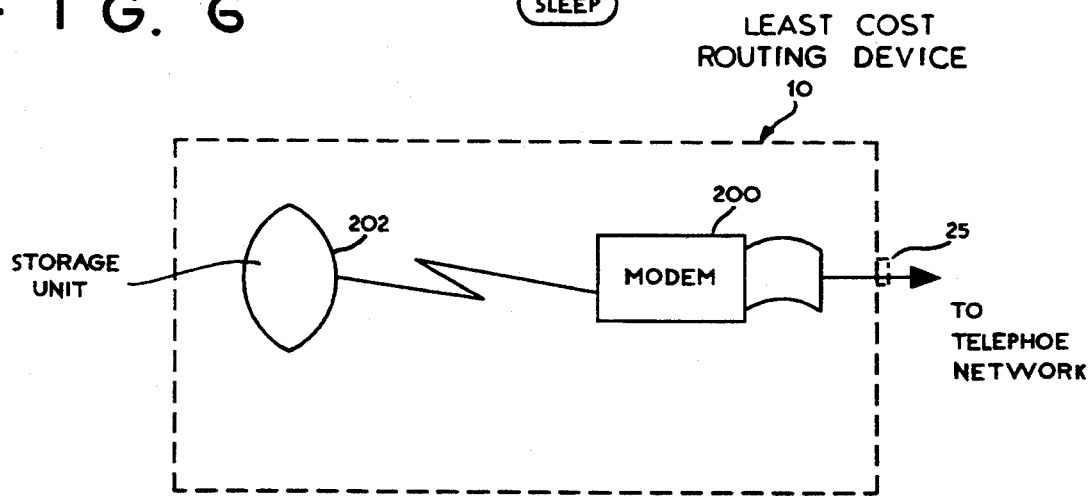
FIG. 6 is a block diagram of the device with a modem.

Because the rates among different carrier may change monthly, or even daily and weekly depending on circumstances, the database may be updated. In one embodiment, the database can be downloaded through a modem 200 (FIG. 6) to a storage unit 202. However, this method will require additional components such as a modem.

In another embodiment, the Eprom chip containing the database is removed, such as by accessing the chip through an opening 210. Once the chip is removed, another updated chip is substituted and the housing cover 26 replaced on the device 10. In an alternative embodiment, an end can be removed, and the entire circuit board 220 holding the components slid outwardly to expose the chips to be replaced. Once any chips are replaced, the circuit board can be slid back into the housing.

The device 10 of the present invention is advantageous over prior art call metering devices that are incorporated within the phone itself. The device of the present invention can be connected into the phone line coming from a phone and easily hidden from view or placed in an inconspicuous location, and a consumer does not have to purchase a new phone. Basic microprocessor and other circuits are used and can be contained in an attractive housing, and the date and time can be easily set by the keypad of a standard telephone. Additionally, in some instances, the determined cost of a phone call may be given a bias for preference to a given carrier. For example, if a first carrier is no greater than 5% additional cost than a second carrier, that first carrier may be given a preference.

It is to be understood that the above description is only one embodiment of the invention. Numerous other arrangements may be devised by one skilled in the art without departing from the spirit and scope of the invention.

That which is claimed is:

1. A device for routing telephone calls along a least cost route originating from a first telephone to a second telephone having an associated telephone number via a network having a plurality of alternate communication switch paths corresponding to different carriers which can be chosen to route the call and normally providing a current to said first telephone when said first telephone is in use, comprising
   a housing forming an enclosure and comprising first jack means for connection to said first telephone and second jack means for connection to said network
   switch means operatively connected to said first jack means for disconnecting said first telephone from said network,
   means operatively connected to said switch means for generating a current through said switch means to the first telephone, corresponding to a current provided by said network,
   database means for storing billing rate parameters for determining a least cost communication path for call corresponding to said telephone number,
   means operatively connected to said switch means for detecting and storing said telephone number originating from the first telephone,
   means for addressing said database means for identifying a plurality of communication switch paths to said second telephone and the cost rate of each path,
   means for comparing the cost rate of each path so as to determine a least cost route, and
   means operatively connected to said switch means and said second jack means for generating a number sequence corresponding to a desired carrier so that said call is routed through said second jack means to the selected communication path and carrier to establish a switched connection between said first telephone and said second telephone.

2. The device according to claim 1 wherein said least cost communication path parameters include the time and date of the call.

3. The device according to claim 1 wherein said switch means connects said first telephone to said network during an incoming call.

4. The device according to claim 1 including an internal power supply connected to said means for generating a current.

5. The device according to claim 1 wherein said means for generating said number sequence comprises a dual tone multifrequency generator.

6. The device according to claim 1 wherein said housing is substantially cylindrical with opposing ends, wherein said first jack means is positioned on one end and said second jack means is positioned on the opposite end.

7. The device according to claim 1 wherein said detecting means includes a dual tone multifrequency detector.

8. The device according to claim 1 including means for maintaining the time and date so as to determine the least cost route based on the time and date of the call.

9. The device according to claim 1 wherein said cost may be given a bias for preference to a given carrier.

10. The device according to claim 1 including means for updating said database means with a current billing rate schedule.

11. The device according to claim 10 wherein said update means includes a circuit board mounted inside said enclosure, and said database means comprises a removable chip on said circuit board, and means for accessing said removable chip from outside said housing.

12. The device according to claim 11 wherein said means for accessing said removable chip includes a removable cover on said housing for accessing said chip.

13. The device according to claim 10 wherein said update means includes a modem for receiving signals through said telephone line and downloading the update information.

14. A device for routing telephone calls along a least cost route originating from a first telephone to a second telephone having an associated telephone number via a network having a plurality of alternate communication switch paths corresponding to different carriers which can be chosen to route the call and normally providing a current to said first telephone when said first telephone is in use, comprising
   a housing forming an enclosure and comprising first jack means for connection to said first telephone, and second jack means for connection to said network, means positioned on said housing for visibly displaying the time and date,
   switch means operatively connected to said first jack means for disconnecting said first telephone from said network,
   means operatively connected to said first jack means for disconnecting said first telephone from said network,
   means operatively connected to said switch means for generating a current through said switch means to said first telephone corresponding to said current provided by said network,
   means operatively connected to said time and date display means and said switch means for receiving a predetermined dial sequence from said first telephone corresponding to a predetermined date and time to be displayed and means for changing the displayed time and date based on the received signals,
   database means for storing billing rate parameters for determining a least cost communication path for a call corresponding to said telephone number, based on such factors as the time and date of the call,
   means operatively connected to said switch means for detecting and storing said telephone number originating from the first telephone,
   means for addressing said database means for identifying a plurality of communication switch paths to said second telephone and the cost rate of each path,
   means for comparing the cost rate of each path so as to determine a least cost route, and means operatively connected to said switch means and said second jack means for generating a number sequence corresponding to a desired carrier so that said call is routed through said second jack means to the selected communication path and carrier to establish a switched connection between said first telephone and said second telephone.

15. The device according to claim 14 including means positioned on said housing for manually changing the date and time of the display.

16. The device according to claim 14 wherein said means for generating said number sequence comprises a dual tone multifrequency generator.

17. The device according to claim 14 wherein said housing is substantially cylindrical with opposing ends, wherein said first jack means is positioned on one end and second jack means is positioned on the other end.

18. The device according to claim 14 wherein said detecting means includes a dual tone multifrequency detector.

19. The device according to claim 14 including means for updating said database means with a current billing rate schedule.

20. The device according to claim 19 wherein said update means includes a circuit board mounted inside said enclosure, and said database means comprises a removable chip on said circuit board, and means for accessing said removable chip from outside said housing.

21. The device according to claim 20 wherein said means for accessing said removable chip includes a removable cover on said housing for accessing said chip.

22. The device according to claim 19 wherein said update means includes a modem for receiving signals through said telephone line and downloading the update information.

23. The device according to claim 14 wherein said cost may be given a bias for preference to a given carrier.

24. An apparatus for displaying a time quantity which can be initiated from a telephone of the type capable of generating dual tone multifrequency signals comprising a housing forming an enclosure and comprising first jack means for interconnection to said telephone, and second jack means for connection to a telephone switching network, said network normally providing a current to said telephone when said telephone is in use, means positioned on said housing for visibly displaying a time quantity, switch means operatively connected to said first jack means for disconnecting said telephone from said network, means operatively connected to said switch means for generating a current through said switch means to said telephone corresponding to said current provided by said network, means operatively connected to said means for displaying a time quantity and said first jack means for receiving said dual tone multifrequency signals, from said telephone when said telephone is disconnected from said network, said signals corresponding to said time quantity and for changing the displayed time quantity based on signals from said telephone, and means responsive to a dialing sequence originating on said telephone and operatively connected to said switch means for connecting said telephone to said network.

25. The apparatus according to claim 24 wherein said time quantity is the time of day.

26. The apparatus according to claim 24 wherein said time quantity is the date.

* * * * *

UNITED STATES PATENT AND TRADEMARK OFFICE
CERTIFICATE OF CORRECTION

PATENT NO. : 5,425,085

DATED : June 13, 1995

INVENTOR(S) : Gerald J. Weinberger, et al.

It is certified that error appears in the above-identified patent and that said Letters Patent is hereby corrected as shown below:

Col. 8, line 29-31, please delete "means operatively connected to said first jack means for disconnecting said first telephone from said network,".

Signed and Sealed this

Seventh Day of November, 1995

*Attest:*

BRUCE LEHMAN

*Attesting Officer*  *Commissioner of Patents and Trademarks*

US005425085B1

(12) REEXAMINATION CERTIFICATE (4452nd)

United States Patent
Weinberger et al.

(10) Number: US 5,425,085 C1
(45) Certificate Issued: Oct. 9, 2001

(54) LEAST CONTROL ROUTING DEVICE FOR SEPARATE CONNECTION INTO PHONE LINE

(75) Inventors: Gerald J. Weinberger, Smithtown; Roger C. Lee, Wading River, both of NY (US)

(73) Assignee: Rates Technology Inc., Smithtown, NY (US)

Reexamination Request:
No. 90/005,472, Aug. 31, 1999

Reexamination Certificate for:
Patent No.: 5,425,085
Issued: Jun. 13, 1995
Appl. No.: 08/210,670
Filed: Mar. 18, 1994

Certificate of Correction issued Nov. 7, 1995.

(51) Int. Cl.$^7$ ............................. H04M 15/00; H04M 7/00
(52) U.S. Cl. ........................... 379/112; 379/111; 379/113; 379/114; 379/116; 379/130; 379/131; 379/219; 379/220; 379/221
(58) Field of Search ....................... 379/111, 112, 379/113, 114, 115, 116, 130, 131, 132, 219, 220, 221

(56) References Cited

U.S. PATENT DOCUMENTS

| 5,161,109 | 11/1992 | Keating et al. | 364/464.02 |
|-----------|---------|----------------|------------|
| 5,212,789 | 5/1993 | Rago | 395/600 |
| 5,400,395 | * 3/1995 | Berenato | 379/114 |
| 5,420,914 | * 5/1995 | Blumhardt | 379/115 |
| 5,473,630 | 12/1995 | Penzias et al. | 375/114 |
| 5,515,425 | 5/1996 | Penzias et al. | 379/114 |
| 5,799,071 | 8/1998 | Azar et al. | 379/113 |

FOREIGN PATENT DOCUMENTS 0 586 157 A2   3/1994   (EP) ........................... G06F/15/403

OTHER PUBLICATIONS

Communiqué Telecommunications, Inc. (Ontario, California), "Customized Telemiser Selects Low–Cost Routing," *Computerworld*, vol. XVIII, No. 48, Nov. 28, 1983, p. 109 (plus cover page and contents page).

Communiqué Telecommunications, Inc. (Ontario, California), "Least–Cost Router," *Telecommunications*, vol. 18, No. 1, Jan., 1984, p. 92 (plus cover page and contents page).

Communiqué Telecommunications, Inc. (Ontario, California), "How to Make the Least of Your Long Distance Phone Bill," *Communications News*, vol. 21, No. 9, Sep. 1984, p. 171 (plus cover page).

Communiqué Telecommunications, Inc. (Ontario, California), "How to Make the Least of Your Long Distance Phone Bill," *Sports Illustrated*, Oct. 1, 1984, p. 113 (plus cover page).

CALLMISER Trademark File History (Registration No. 1725288; Registration Date Oct. 20, 1992; International Class 9).

\* cited by examiner

*Primary Examiner*—Vijay Shankar

(57) ABSTRACT

A device interconnects within the phone line coming from a first phone and routes telephone calls along a least cost route originating from the first telephone to a second telephone via the network. A housing forms an enclosure and has a first jack for interconnection to the phone side of the phone line and a second jack for interconnection to the network side of the phone line. The housing forms an enclosure which includes a switch for disconnecting the first phone from the network. The device generates a source of current through the switch to the first phone corresponding to the amount of current provided by the phone network. A database stores billing rate parameters for determining various communication paths of different carriers based on parameters such as the time and date of the call. Phone calls from the first phone are detected and stored. The database is addressed and a plurality of communication switch paths are identified as well as the cost rate of each path. The cost rates for each identified path are compared to determine a least cost route for the call. The device generates a number sequence corresponding to a desired carrier so that the dialed call is routed through the second jack and phone line to the selected communication path and carrier so as to establish a switched connection between the first and second phones.

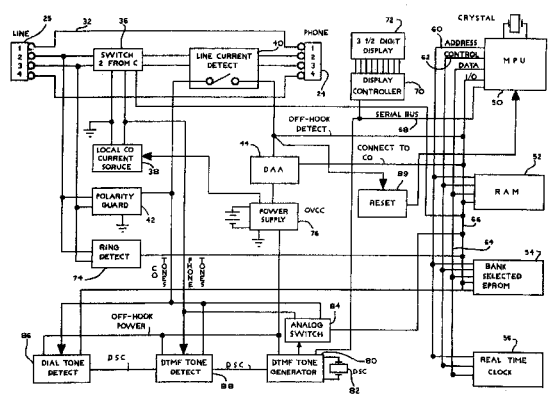

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–26 is confirmed.

* * * * *

US005425085C2

(12) EX PARTE REEXAMINATION CERTIFICATE (6997th)

United States Patent
Weinberger et al.

(10) Number: US 5,425,085 C2
(45) Certificate Issued: Aug. 11, 2009

(54) LEAST CONTROL ROUTING DEVICE FOR SEPARATE CONNECTION INTO PHONE LINE

(75) Inventors: Gerald J. Weinberger, Smithtown, NY (US); Roger C. Lee, Wading River, NY (US)

(73) Assignee: Rates Technology Inc., Smithtown, NY (US)

Reexamination Request:
No. 90/007,939, Feb. 14, 2006

Reexamination Certificate for:
Patent No.: 5,425,085
Issued: Jun. 13, 1995
Appl. No.: 08/210,670
Filed: Mar. 18, 1994

Reexamination Certificate C1 5,425,085 issued Oct. 9, 2001

Certificate of Correction issued Nov. 7, 1995.

(51) Int. Cl.
H04M 15/00 (2006.01)
H04M 7/00 (2006.01)

(52) U.S. Cl. ............... 379/114.02; 379/111; 379/114.01; 379/114.1; 379/116; 379/130; 379/131; 379/219; 379/221.02; 379/442

(58) Field of Classification Search .................. None
See application file for complete search history.

(56) References Cited

U.S. PATENT DOCUMENTS

| 3,813,495 A | 5/1974 | Conerly |
| 3,829,617 A | 8/1974 | Caithamer et al. |
| 3,943,288 A | 3/1976 | Reed et al. |

(Continued)

FOREIGN PATENT DOCUMENTS

| DE | 87 12 382 U | 12/1987 |
| EP | 0 586 157 A2 | 3/1994 |
| FR | 2 600 850 | 12/1987 |

(Continued)

OTHER PUBLICATIONS

C.H. Sederholm and J.W. Van den Berg—Intelligent Telephone—IBM Technical Disclosure Bulletin vol. 23 No. 9—Feb. 1981—Armonk, N.Y.
Kirvan, Paul—"Bargaining for economical LD Services—long-distance telephone services—Communications Management—Column".
Murata/Muratec—"Renal phone capable of real-time billing—Product Announcement".
"New PBX Boosts Revenue One-Third Renovated Inn and Country Club".
Stevenson, Edward, "Tracking calls with your PC/Logging Phone Time Q".

(Continued)

*Primary Examiner*—Joseph R. Pokrzywa

(57) ABSTRACT

A device interconnects within the phone line coming from a first phone and routes telephone calls along a least cost route originating from the first telephone to a second telephone via the network. A housing forms an enclosure and has a first jack for interconnection to the phone side of the phone line and a second jack for interconnection to the network side of the phone line. The housing forms an enclosure which includes a switch disconnecting the first phone from the network. The device generates a source of current through the switch to the first phone corresponding to the amount of current provided by the phone network. A database stores billing rate parameters for determining various communication paths of different carriers based on parameters such as the time and date of the call. Phone calls from the first phone are detected and stored. The database is addressed and a plurality of communication switch paths are identified as well as the cost rate of each path. The cost rates for each identified path are compared to determine a least cost route for the call. The device generates a number sequence corresponding to a desired carrier so that the dialed call is routed through the second jack and phone line to the selected communication path and carrier so as to establish a switched connection between the first and second phones.

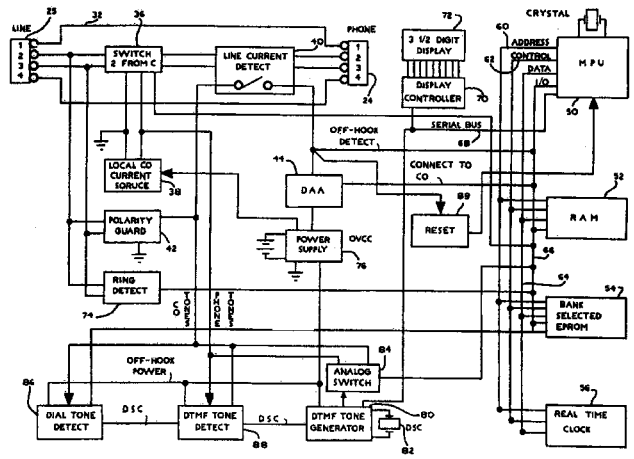

| U.S. PATENT DOCUMENTS | | | |
|---|---|---|---|
| 4,054,756 A | 10/1977 | Comella et al. | |
| D254,141 S | 2/1980 | De Masi | |
| 4,326,123 A | 4/1982 | Hosterman | |
| 4,480,154 A | 10/1984 | Klee | |
| 4,538,030 A | 8/1985 | Fossett et al. | |
| 4,593,157 A | 6/1986 | Usdan | |
| 4,595,983 A | 6/1986 | Gehalo et al. | |
| 4,712,230 A | 12/1987 | Rice et al. | |
| 4,731,818 A | 3/1988 | Clark, Jr. et al. | |
| 4,736,405 A | 4/1988 | Akiyama | |
| 4,751,729 A | 6/1988 | Coleman | |
| 4,763,350 A | 8/1988 | Immendorfer et al. | |
| 4,766,604 A | 8/1988 | Axberg | |
| 4,768,223 A | 8/1988 | Kinoshita et al. | |
| 4,769,834 A | 9/1988 | Billinger et al. | |
| 4,777,647 A | 10/1988 | Smith et al. | |
| 4,797,910 A | 1/1989 | Daudelin | |
| 4,813,065 A | 3/1989 | Segala | |
| 4,825,460 A | 4/1989 | Carter et al. | |
| 4,924,499 A | 5/1990 | Serby | |
| 4,935,956 A | 6/1990 | Hellwarth et al. | |
| 4,972,464 A | 11/1990 | Webb et al. | |
| 5,062,134 A | 10/1991 | Laird | |
| 5,093,858 A | 3/1992 | Hird et al. | |
| 5,153,907 A | 10/1992 | Pugh et al. | |
| 5,161,109 A | 11/1992 | Keating et al. | |
| 5,163,042 A | 11/1992 | Ochiai | |
| 5,173,933 A | 12/1992 | Jabs et al. | 379/58 |
| 5,212,789 A | 5/1993 | Rago | |
| 5,289,536 A | 2/1994 | Hokari | |
| 5,400,395 A | 3/1995 | Berenato | |
| 5,420,914 A | 5/1995 | Blumhardt | |
| 5,473,630 A | 12/1995 | Penzias et al. | |
| 5,515,425 A | 5/1996 | Penzias et al. | |
| 5,799,071 A | 8/1998 | Azar et al. | |

| FOREIGN PATENT DOCUMENTS | | | |
|---|---|---|---|
| GB | 2 128 451 A | 4/1984 |
| GB | 2 134 749 A | 8/1984 |
| GB | 2 218 595 | 11/1989 |
| JP | 1-117455 | 5/1989 |
| JP | 1-155750 | 6/1989 |
| JP | 1-162066 | 6/1989 |
| JP | 1-248858 | 10/1989 |
| JP | 1-273476 | 11/1989 |
| JP | 1-303842 | 12/1989 |
| JP | 2-202153 | 8/1990 |
| JP | 2-266636 | 10/1990 |
| JP | 2-285839 | 11/1990 |
| JP | 3-167946 | 7/1991 |
| JP | 3-201655 | 9/1991 |
| JP | 3-222558 | 10/1991 |
| JP | 04011337 | 1/1992 |
| JP | 04022246 | 1/1992 |
| JP | 4-223739 | 8/1992 |
| JP | 4-317237 | 11/1992 |
| JP | 4-367147 | 12/1992 |
| JP | 5-130192 | 5/1993 |
| JP | 5-219170 | 7/1993 |
| JP | 5-219190 | 8/1993 |
| JP | 6-268641 | 9/1994 |
| JP | 7-143118 | 6/1995 |
| JP | 7-154426 | 6/1995 |
| WO | WO 88/07797 | 10/1988 |

OTHER PUBLICATIONS

SPX, Starplus, Vodavi, General Description Installation and Maintenance Manual, Issue 1, (Sep. 1990).
Strata, DK8 & DK16, Toshiba, Digital Key Telephone System General Description, (Mar. 1993).
ISOETEC® System Technical Manual, (Jul. 1988).

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 24–26 are cancelled.

Claims 1, 6, 14 and 17 are determined to be patentable as amended.

Claims 2–5, 7–13, 15, 16 and 18–23, dependent on an amended claim, are determined to be patentable.

1. A device for routing telephone calls along a least cost route originating from a first telephone to a second telephone having an associated telephone number via a network having a plurality of alternate communication switch paths corresponding to different carriers which can be chosen to route the call and normally providing a current to said first telephone when said first telephone is in use, comprising
   a housing forming an enclosure and comprising first jack means for connection to said first telephone and second jack means for connection to said network
   switch means operatively connected to said first jack means for disconnecting said first telephone from said network *during routing of a telephone call from said first telephone*,
   means operatively connected to said switch means for generating a current through said switch means to the first telephone[,] corresponding to a current provided by said network, *when the first telephone is disconnected from said network by said switch means*,
   database means for storing billing rate parameters for determining a least cost communication path for call corresponding to said telephone number,
   means operatively connected to said switch means for detecting and storing said telephone number originating from the first telephone,
   means for addressing said database means for identifying a plurality of communication switch paths to said second telephone and the cost rate of each path,
   means *actuated subsequent to the detection of said telephone number originating from said first telephone* for comparing the cost rate of each path so as to determine a least cost route, and
   means operatively connected to said switch means and said second jack means for generating a number sequence corresponding to a desired carrier so that said call is routed through said second jack means to the selected communication path and carrier to establish a switched connection between said first telephone and said second telephone phone.

6. [The device according to claim 1] *A device for routing telephone calls along a least cost route originating from a first telephone to a second telephone having an associated telephone number via a network having a plurality of alternate communication switch paths corresponding to different carriers which can be chosen to route the call and normally providing a current to said first telephone when said first telephone is in use, comprising*
   *a housing forming an enclosure and comprising first jack means for connection to said first telephone and second jack means for connection to said network*
   *switch means operatively connected to said first jack means for disconnecting said first telephone from said network,*
   *means operatively connected to said switch means for generating a current through said switch means to the first telephone, corresponding to a current provided by said network,*
   *database means for storing billing rate parameters for determining a least cost communication path for call corresponding to said telephone number,*
   *means operatively connected to said switch means for detecting and storing said telephone number originating from the first telephone,*
   *means for addressing said database means for identifying a plurality of communication switch paths to said second telephone and the cost rate of each path,*
   *means for comparing the cost rate of each path so as to determine a least cost route, and*
   *means operatively connected to said switch means and said second jack means for generating a number sequence corresponding to a desired carrier so that said call is routed through said second jack means to the selected communication path and carrier to establish a switched connection between said first telephone and said second telephone phone,* wherein said housing is substantially cylindrical with opposing ends *and* wherein said first jack means is positioned on one end and said second jack means is positioned on the opposite end.

14. A device for routing telephone calls along a least cost route originating from a first telephone to a second telephone having an associated telephone number via a network having a plurality of alternate communication switch paths corresponding to different carriers which can be chosen to route the call and normally providing a current to said first telephone when said first telephone is in use, comprising
    a housing forming an enclosure and comprising first jack means for connection to said first telephone, and second jack means for connection to said network, means positioned on said housing for visibly displaying the time and date,
    switch means operatively connected to said first jack means for disconnecting said first telephone from said network *during routing of a telephone call from the first telephone*,
    means for operatively connected to said switch means for generating a current through said switch means to said first telephone corresponding to said current provided by said network, *when the first telephone is disconnected from the network by the switch means*,
    means operatively connected to said time and date display means and said switch means for receiving a predetermined dial sequence from said first telephone corresponding to a predetermined date and time to be displayed and means for changing the displayed time and date based on the received signals,
    database means for storing billing rate parameters for determining a least cost communication path for a call corresponding to said telephone number, based on such factors as the time and date of the call, means operatively connected to said switch means for detecting and storing said telephone number originating from the first telephone, means for addressing said database means for identifying a plurality of communication switch paths to said second telephone and the cost rate of each path, means *actuated subsequent to the detection of said telephone number originating from the first telephone* for comparing the cost rate of each path so as to determine a least cost route, and means operatively connected to said switch means and said second jack means for generating a number sequence corresponding to a desired carrier so that said call is routed through said second jack means to the selected communication path and carrier to establish a switched connection between said first telephone and said second telephone.

17. [The device according to claim 14] *A device for routing telephone calls along a least cost route originating from a first telephone to a second telephone having an associated telephone number via a network having a plurality of alternate communication switch paths corresponding to different carriers which can be chosen to route the call and normally providing a current to said first telephone when said first telephone is in use, comprising*

*a housing forming an enclosure and comprising first jack means for connection to said first telephone, and second jack means for connection to said network,*

*means positioned on said housing for visibly displaying the time and date,*

*switch means operatively connected to said first jack means for disconnecting said first telephone from said network,*

*means operatively connected to said switch means for generating a current through said switch means to said first telephone corresponding to said current provided by said network,*

*means operatively connected to said time and date display means and said switch means for receiving a predetermined dial sequence from said first telephone corresponding to a predetermined date and time to be displayed and*

*means for changing the displayed time and date based on the received signals,*

*database means for storing billing rate parameters for determining a least cost communication path for a call corresponding to said telephone number, based on such factors as the time and date of the call,*

*means operatively connected to said switch means for detecting and storing said telephone number originating from the first telephone,*

*means for addressing said database means for identifying a plurality of communication switch paths to said second telephone and the cost rate of each path,*

*means for comparing the cost rate of each path so as to determine a least cost route, and*

*means operatively connected to said switch means and said second jack means for generating a number sequence corresponding to a desired carrier so that said call is routed through said second jack means to the selected communication path and carrier to establish a switched connection between said first telephone and said second telephone,*wherein said housing is substantially cylindrical with opposing ends *and* wherein said first jack means is positioned on one end and said second jack means is positioned on the opposite end.

* * * * *